US008802582B2

(12) United States Patent
Malyala et al.

(10) Patent No.: US 8,802,582 B2
(45) Date of Patent: *Aug. 12, 2014

(54) HIGH TEMPERATURE AMMONIA SCR CATALYST AND METHOD OF USING THE CATALYST

(75) Inventors: Rajashekharam Malyala, Camarillo, CA (US); Svetlana Iretskaya, Bad Honnef (DE); Stephen J. Golden, Santa Barbara, CA (US)

(73) Assignee: Catalytic Solutions, Inc., Ventura, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 11/731,570

(22) Filed: Mar. 29, 2007

(65) Prior Publication Data
US 2008/0167178 A1 Jul. 10, 2008

Related U.S. Application Data

(63) Continuation-in-part of application No. 11/651,290, filed on Jan. 9, 2007, now Pat. No. 7,527,776.

(51) Int. Cl.
*B01J 29/06* (2006.01)
(52) U.S. Cl.
USPC .................. 502/64; 502/63; 502/65; 502/66; 502/67; 502/69; 502/71; 502/73; 502/74; 502/75
(58) Field of Classification Search
USPC .......... 502/63, 64, 65, 66, 67, 69, 71, 73, 74, 502/75; 423/239.1, 239.2
See application file for complete search history.

(56) References Cited

U.S. PATENT DOCUMENTS

| | | | |
|---|---|---|---|
| 4,004,875 A | 1/1977 | Zink et al. | |
| 4,160,805 A | 7/1979 | Inaba et al. | |
| 4,510,265 A | 4/1985 | Hartwig | |
| 4,759,918 A | 7/1988 | Homeier et al. | |
| 4,833,113 A | 5/1989 | Imanari et al. | |
| 4,900,517 A | 2/1990 | Domesle et al. | |
| 4,912,776 A | 3/1990 | Alcorn | |
| 4,961,917 A | 10/1990 | Byrne | |
| 5,100,632 A | 3/1992 | Dettling et al. | |
| 5,413,699 A | 5/1995 | Chou | |
| 5,505,919 A | 4/1996 | Morii et al. | |
| 5,589,147 A | 12/1996 | Farnos et al. | |
| 5,681,788 A * | 10/1997 | Kanesaka et al. | 502/65 |
| 5,840,649 A | 11/1998 | Ichiki et al. | |
| 5,900,222 A | 5/1999 | Ito et al. | |
| 5,911,956 A * | 6/1999 | Viel Lamare et al. | 422/177 |
| 5,964,908 A | 10/1999 | Malina | |
| 5,988,115 A | 11/1999 | Anderson et al. | |
| 6,013,599 A | 1/2000 | Manson | |
| 6,089,855 A | 7/2000 | Becker et al. | |
| 6,284,211 B1 | 9/2001 | Miyadera et al. | |
| 6,383,463 B1 | 5/2002 | Mochida et al. | |
| 6,485,289 B1 | 11/2002 | Kelly et al. | |
| 6,609,483 B1 | 8/2003 | Albrecht et al. | |
| 6,677,264 B1 * | 1/2004 | Klein et al. | 502/74 |
| 6,756,336 B2 * | 6/2004 | Kasahara et al. | 502/65 |
| 6,780,805 B2 * | 8/2004 | Faber et al. | 502/66 |
| 6,971,336 B1 | 12/2005 | Chojnacki et al. | |
| 7,084,086 B2 * | 8/2006 | Kasahara et al. | 502/60 |
| 7,527,776 B2 | 5/2009 | Golden et al. | |
| 2001/0022956 A1 * | 9/2001 | Okamoto et al. | 423/213.5 |
| 2002/0016259 A1 | 2/2002 | Yoshikawa | |
| 2003/0083193 A1 * | 5/2003 | Takaya et al. | 502/304 |
| 2004/0141898 A1 | 7/2004 | Kekar et al. | |
| 2005/0159304 A1 | 7/2005 | Ichiki et al. | |
| 2006/0021910 A1 | 2/2006 | Yaluris et al. | |
| 2006/0029535 A1 | 2/2006 | Ott | |

(Continued)

FOREIGN PATENT DOCUMENTS

WO 2006044764 4/2006
WO 2008085265 7/2008

OTHER PUBLICATIONS

Eranen, et al., "Enhancement of the catalytic activity of Cu-ZSM-5 for nitric oxide decomposition by introduction of copper during the zeolite synthesis," Applied Catalysis B: Environmental, vol. 4, 1994, pp. 213-223.

(Continued)

*Primary Examiner* — Elizabeth Wood
(74) *Attorney, Agent, or Firm* — Thaddius J. Carvis (57) ABSTRACT

A catalyst and a method for selectively reducing nitrogen oxides ("$NO_x$") with ammonia are provided. The catalyst includes a first component comprising a zeolite or mixture of zeolites selected from the group consisting of ZSM-5, ZSM-11, ZSM-12, ZSM-18, ZSM-23, MCM-zeolites, mordenite, faujasite, ferrierite, zeolite beta, and mixtures thereof; a second component comprising at least one member selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof; optionally an oxygen storage material and optionally an inorganic oxide. The catalyst selectively reduces nitrogen oxides to nitrogen with ammonia at high temperatures. The catalyst has high hydrothermal stability. The catalyst has high activity for conversion of low levels of nitrogen oxides in exhaust streams. The catalyst and the method may have special application to selective reduction of nitrogen oxides in exhaust gas from gas turbines and gas engines, although the catalyst and the method have broad application to a wide range of gas streams that have excess oxygen and high temperatures. The temperature of exhaust gas from gas turbines and gas engines is high. Both the high temperature and the low levels of inlet $NO_x$ are challenging for selective catalytic reduction (SCR) catalysts.

19 Claims, 5 Drawing Sheets

(56) References Cited

U.S. PATENT DOCUMENTS

| | | | |
|---|---|---|---|
| 2006/0039843 | A1 | 2/2006 | Patchett et al. |
| 2006/0120936 | A1 | 6/2006 | Alive et al. |
| 2006/0155102 | A1 | 7/2006 | Lindall et al. |
| 2006/0159607 | A1 | 7/2006 | Ott |
| 2006/0182676 | A1 | 8/2006 | Tran et al. |
| 2006/0217579 | A1 | 9/2006 | Bailey |
| 2006/0228283 | A1 | 10/2006 | Malyala et al. |
| 2007/0180760 | A1 | 8/2007 | Zhou et al. |
| 2007/0269359 | A1 | 11/2007 | Fisher et al. |
| 2007/0274889 | A1 | 11/2007 | Nakatsuji et al. |

OTHER PUBLICATIONS

Li, et al., "Selective catalytic reduction of nitric oxide by methane over cerium and silver ion-exchanged ZSM-5 zeolites," Applied Catalysis A: General, vol. 165, 1997, pp. 15-34.

Meunier, et al., "Mechanistic differences in the selective reduction of NO by propene over cobalt- and silver-promoted alumina catalysts: kinetic and in situ DRIFTS study," Catalysis Today, vol. 59, 2000, pp. 287-304.

Miyadera, "Selective reduction of $NO_x$ by ethanol on catalysts composed of $Ag/Al_2O_3$ and $Cu/TiO_2$ without formation of harmful by-products," Applied Catalysis B: Environmental, vol. 16, 1998, pp. 155-164.

Flytzani-Stephanopoulos, et al., "Direct Catalytic Decomposition of Nitric Oxide," prepared for U.S. Department of Energy, Jun. 15, 1995.

Yang, et al., "Ion-exchanged pillared clays for selective catalytic reduction of NO by ethylene in the presence of oxygen," Applied Catalysis B: Environmental, vol. 19, 1998, pp. 289-304.

Maaskant for CRI/Criterion Catalyst Co., "The Shell Denox System (SDS) for Nitric Acid Plants," Nitrogen 2005, Bucharest, Romania.

Maaskant for CRI Catalyst Company—Environmental Catalyst and Systems, "The Shell System for NOx Removal and Dioxin Destruction from Incineration Flue Gas," 3rd International Symposium on Incineration and Flue Gas Treatment Technologies, Jul. 2001, Brussels.

Lee, et al., Evaluation of Cu-Based SCR/DPF Technology for Diesel Exhaust Emission Control, SAE Paper 2008-01-0072, SAE International 2008, pp. 75-80.

\* cited by examiner

HIGH TEMPERATURE AMMONIA SCR CATALYST AND METHOD OF USING THE CATALYST

RELATED APPLICATION

This application is a continuation-in-part of U.S. application Ser. No. 11/651,290, filed Jan. 9, 2007, now U.S. Pat. No. 7,527,776 which is herein incorporated by reference in its entirety.

FIELD OF THE INVENTION

The invention relates to a catalyst and a method for selective catalytic reduction of low levels of nitrogen oxides to ultra-low levels with ammonia at high temperatures.

BACKGROUND

Nitrogen oxides are present in exhaust gases from stationary sources such as power plants, industrial processes, simple cycle and combined cycle gas turbines, gas engines, and diesel engines. Emissions from these sources are subject to regulations in both the United States and Europe. The laws which regulate emission standards have become stricter in recent years and will continue to become stricter in the future. Many countries require 90% $NO_x$ removal. Modern gas turbines generally emit about 25 ppm $NO_x$, thus the $NO_x$ level needs to be reduced to about 2.5 ppm in order to comply with governmental regulations.

Diesel engines normally operate at air to fuel ratios above stoichiometric. Emissions of nitrogen oxides and particulates from diesel-fueled vehicles may be significant. Emissions from diesel vehicles are also subject to regulations in both the United States and Europe.

One method of removing $NO_x$ in exhaust gas is to contact the exhaust stream with a reductant such as ammonia in the presence of a catalyst at elevated temperature. The catalyzed reaction of the reductant with $NO_x$ is referred to as selective catalytic reduction (SCR). Urea, ammonium hydroxide, ammonium formate, and other nitrogen-containing chemicals can also be used as a source of ammonia.

The temperature of the exhaust gas is critical in determining the type of catalyst that can be used because certain catalysts function (or function best) in certain temperature ranges. Exhaust gases from diesel engines are typically rather low, about 200° C., while the exhaust gases from gas turbines and gas engines are typically in the range of about 300° C. to about 700° C. Thus, catalysts used with diesel applications are not likely to work effectively when used with gas turbines or gas engines and vice versa.

Traditional ammonia SCR catalysts are based on vanadia/titania. Imanari, et al. (U.S. Pat. No. 4,833,113), for example, describe an SCR catalyst comprising an oxide of titanium, an oxide of tungsten, and an oxide of vanadium. Vanadia/titania ammonia SCR catalysts normally operate at a temperature of about 250-370° C. Exhaust gas from light duty diesel vehicles is normally at a temperature of about 200° C. or less. Vanadia/titania SCR catalysts do not have significant activity at temperatures as low as 200° C. or at high temperatures.

Byrne (U.S. Pat. No. 4,961,917, assigned to Engelhard Corporation) discloses a method of passing ammonia, nitrogen oxides, and oxygen over iron or copper-promoted zeolite catalysts to selectively catalyze the reduction of the nitrogen oxides. The fresh copper-promoted catalyst has good activity. However, the copper catalyst deactivates significantly when aged. Although the iron catalyst is far more stable than the copper catalyst, it has maximum activity at about 350-500° C., significantly higher than the 200° C. temperatures that occur in many diesel exhaust streams. In addition, the copper and iron catalysts have low activity at temperatures greater than 500° C., which often occur with gas engines and gas turbines, and are not very efficient in reducing $NO_x$.

Ito et al. (U.S. Pat. No. 5,900,222) describes a process for treating $NO_x$ containing gases at temperatures in the range of 300-560° C. using a cerium containing zeolite catalyst and a reducing agent. The catalyst described in Ito was designed to be used primarily with diesel exhaust gases. Diesel engines generally emit much higher levels of $NO_x$ than do gas turbines and gas engines. Because the rate of $NO_x$ conversion is generally a function of how much $NO_x$ is present to be reduced, catalysts effective for reducing high amounts of $NO_x$ may not be effective for reducing low amounts of $NO_x$ and vice versa.

Ichiki et al. (U.S. Patent Application Publication No. 2005/0159304) teach denitration catalysts for use at high temperatures. Multiple catalysts are described. One contains a composite oxide composed of titanium oxide and at least one of tungsten oxide, molybdenum oxide and boron oxide. Another catalyst contains zirconium oxide and $SO_3$ or $SO_4^{2-}$. The final catalyst described contains at least one of tungsten oxide, molybdenum oxide and boron oxide supported on a carrier comprising zirconium oxide and $SO_3$ or $SO_4^{2-}$. No long-term data is provided. Some of the drawbacks seen in some of the catalysts described include the use of sulfuric acid in preparing the catalyst and the possibility that such catalysts will not be active long-term.

There is a need for ammonia SCR catalysts that are stable toward aging and that are active at high temperatures and are effective in further reducing low levels of inlet $NO_x$.

SUMMARY OF THE INVENTION

The present invention is a catalyst and method for selective reduction of nitrogen oxides in a gas stream with ammonia by contacting the gas stream with ammonia in the presence of the catalyst. The catalyst contains a first component comprising a zeolite or mixture of zeolites selected from the group consisting of ZSM-5, ZSM-11, ZSM-12, ZSM-18, ZSM-23, MCM-zeolites, mordenite, faujasite, ferrierite, zeolite beta, and mixtures thereof; a second component selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof; optionally an oxygen storage material ("OSM"); and optionally an inorganic oxide. The catalyst of the invention has particular utility for use with high temperature exhaust gases in the range of about 300° C. to about 700° C. It should be noted that the exhaust temperature refers to the temperature of the exhaust when it leaves the engine.

DETAILED DESCRIPTION

Exhaust gas from motor vehicles and engines such as gas turbines contains nitrogen oxides. The nitrogen oxides in the exhaust gas can be removed by contacting the exhaust gas with reducing agents such as ammonia in the presence of a selective catalytic reduction (SCR) catalyst. The ammonia or other reducing agent reacts with the nitrogen oxides to form nitrogen and water.

Water vapor in the exhaust gas can deactivate the SCR catalyst, lowering the $NO_x$ conversion. Hydrothermal stability of the SCR catalyst is therefore important.

The exhaust gas from light duty diesel engines is at low temperature, about 200° C. Low temperature activity of the SCR catalyst is therefore important for diesel engine applications. The exhaust gas from gas turbines and gas engines is at a high temperature, about 300° C. to about 700° C. High temperature activity of the SCR catalyst is therefore important for gas engine and gas turbine applications. The SCR catalysts according to embodiments of the present invention have good $NO_x$ conversion activity at high temperatures.

According to Alcorn (U.S. Pat. No. 4,912,726), it is believed that the reduction of NO requires the presence of oxygen, while the reduction of $NO_2$ does not. Alcorn also asserts that the reduction of $NO_2$ is easier to carry out than the reduction of NO.

Alcorn states that the evidence seems to support a two-step process for the ammonia-SCR process, where the following reactions occur in parallel:

$NO + \frac{1}{2}O_2 \rightarrow NO_2$ $6NO_2 + 8NH_3 \rightarrow 7N_2 + 12H_2O$ As shown in the examples below, the SCR catalysts according to embodiments of the present invention have high activity at high temperatures with low levels of inlet $NO_x$. The SCR catalysts of the present invention remain active at high temperatures over extended periods of time.

The catalysts of the present invention comprise: a first component comprising a zeolite or mixture of zeolites selected from the group consisting of ZSM-5, ZSM-11, ZSM-12, ZSM-18, ZSM-23, MCM-zeolites, mordenite, faujasite, ferrierite, zeolite beta, and mixtures thereof; a second component selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof; an oxygen storage material and optionally an inorganic oxide. Lanthanides are defined to mean Y, La, Pr, Nd, Sm, Eu, Gd, Ho or Yb. Actinides are defined to mean Th, Pa, U, Np, Pu, Am, Cm, Bk, Cf, Es, Fm, Md, No, and Lr. Oxygen storage materials may generally be cerium oxide-based materials, as described in more detail below. The inorganic oxide may generally be alumina, silica, or titania, as described in more detail below.

The catalysts of the current invention offer benefits over the prior art. Some prior art patents, such U.S. Pat. No. 5,900,222, are directed toward cerium containing zeolite catalysts. The entire catalyst in the prior art is composed of a zeolite, which can be expensive. The catalyst of the present invention, however, contains a first component comprising a zeolite or mixture of zeolites; a second component comprising a member selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof; optionally an oxygen storage material and optionally an inorganic oxide. The presence of these additional components eliminates the need for 100% zeolite while producing a high conversion rate yielding a more cost effective catalyst. Although not wishing to be bound by a theory, is also believed that the additional components contribute to the catalyst's ability to reduce low levels of inlet $NO_x$ even further.

Further, the catalysts of the current invention function well at high temperatures. Until now, there were no useful high temperature SCR catalysts that were effective in reducing low levels of inlet $NO_x$ to ultra-low levels without significant deactivation at high temperatures for prolonged periods of time. The current practice is to cool exhaust gases down to a temperature where available catalysts are active. This cooling process is costly, time-consuming and requires extensive equipment and space. The catalysts of the current invention solve this problem. There is no need for the extensive cooling process because the catalysts function at high exhaust temperatures.

First Component

The catalysts according to embodiments of the present invention comprise at least one zeolite. The zeolite may be selected from the group consisting of ZSM-5, zeolite beta, a ZSM-type zeolite, a MCM-type zeolite, mordenite, faujasite, ferrierite, and mixtures thereof. In an embodiment, the zeolite may be selected from the group consisting of ZSM-5, ZSM-11, ZSM-12, ZSM-18, ZSM-23, a MCM-zeolite, zeolite beta, and mixtures thereof. In an embodiment, the first component may comprise a mixture of two or more zeolites, preferably ZSM-5 and zeolite beta. In a further embodiment, the ratio of zeolite beta to ZSM-5 is about 1:about 1. In another embodiment, the first component may comprise a mixture of mordenite and ZSM-5, preferably in a ratio of about 1:about 1. In a further embodiment, the first component may comprise a mixture of faujasite and ZSM-5, preferably in a ratio of about 1:about 1. The zeolites may be combined at various ratios.

The zeolite or mixture of zeolites may be in the H-form, the Na-form, the ammonium-form, or mixtures thereof. The H-form of the zeolite may be a preferred form of the zeolite or mixture of zeolites.

The term "exchanged with" means that protonic sites on the zeolite are replaced with the second component but the excess second component is washed away. The terms "treated with" and "exchanged with" are known to one of skill in the art. "Treated with" includes, but is not limited to, "exchanged with," or that the zeolite is mixed with the second component and protonic sites on the zeolite are replaced with the second component, for example, cerium, and further that the zeolite is doped with the second component. The zeolite may also be treated with the second component. The $SiO_2/Al_2O_3$ ratio of the zeolite may be in a range of about 1 to about 500, more preferably about 10 to about 150, and most preferably about 30 to about 70. Although not wishing to be bound by a theory, it is believed that zeolites having a $SiO_2/Al_2O_3$ ratio greater than about 10 may be beneficial in enhancing the hydrothermal stability of the catalysts. A $SiO_2/Al_2O_3$ ratio of about 40 may be a preferred ratio.

The catalyst may comprise about 20 to about 100 weight percent zeolite, more preferably about 40 to about 80 weight percent zeolite, and most preferably about 50 weight percent zeolite.

Second Component

The second component of the catalyst according to embodiments of the present invention may comprise at least one component selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof preferably cerium.

The catalyst of the present invention may comprise about 1 to about 30 weight percent of the second component, more preferably about 5 to about 20 weight percent, where the weight percentage of the second component is calculated based on the total metal content relative to the total weight of the zeolite, oxygen storage material and inorganic oxide, which may or may not be present.

The catalyst according to embodiments of the present invention may also comprise a strontium second component in addition to, or as a partial replacement for, the second component selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof. Without intending to be limited to a theory, it is believed that the strontium component may improve the rheology and stickiness of the catalyst.

If the catalyst according to embodiments of the present invention comprises a strontium second component, the catalyst may comprise about 2 to about 35 weight percent of the strontium second component, more preferably about 5 to about 25 weight percent of the strontium second component, and most preferably about 8 to about 15 weight percent of the strontium second component, where the weight percent of the strontium second component is on the basis of strontium metal.

Oxygen Storage Material

An oxygen storage material is an additional component of the catalyst of the present invention. Oxygen storage materials may generally comprise a cerium-oxide-based material. Oxygen storage materials can take up oxygen from oxygen-rich feed streams and give up oxygen to oxygen-deficient feedstreams. The oxygen storage material may also be a support for the second component.

In some embodiments of the present invention, the oxygen storage material is not required. In those embodiments, the catalyst may comprise a first component comprising a zeolite or mixture of zeolites selected from the group consisting of ZSM-5, ZSM-11, ZSM-12, ZSM-18, ZSM-23, MCM-zeolites, mordenite, faujasite, ferrierite, zeolite beta, and mixtures thereof; a second component selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof and optionally an inorganic oxide. The catalyst may be used to reduce low levels of inlet $NO_x$, about 50 ppm or less, even further. In some embodiments of the current invention, the catalyst may be used to reduce higher levels of $NO_x$, i.e., above 50 ppm, to lower levels.

The total surface area of cerium oxide-based materials may generally decrease when the cerium oxide-based materials are heated to temperatures of 800° C. or more. One or more metal oxides may be added to the cerium oxide-based material to decrease the degree of sintering of the cerium oxide-based material during exposure to high temperatures. The preferred metal oxides that can be added to the cerium oxide-based materials may be, for example, one or more of $ZrO_2$, $Al_2O_3$, $La_2O_3$, or other rare earth metal oxides. Rare earth metals are defined as scandium and yttrium and the elements with atomic numbers 57 through 71. In one embodiment of the present invention, the oxygen storage material may be a cerium oxide-based material having a composition with the formula $Ce_{1-a}Zr_aO_2$ or $Ce_{1-c-d}Zr_cLan_dO_2$, where Lan is at least one of Y, La, Pr, Nd, Sm, Eu, Gd, Ho, or Yb or mixtures thereof, where "a" can be from about 0 to about 1 and "c" can be from about 0 to about 1 and "d" can be from about 0 to about 1 but "c+d" is not equal to about 0.

In another embodiment, the oxygen storage material in the catalyst according to the present invention may have a formula of $Ce_{0.24}Zr_{0.66}La_{0.04}Y_{0.06}O_2$ (CZLY), $Ce_{0.24}Zr_{0.67}Ln_{0.09}O_2$ (CZL), $Ce_{0.68}Zr_{0.32}O_2$ (CZO), or $Ce_{0.24}Zr_{0.67}Nd_{0.09}O_2$ (CZN). In a preferred embodiment of the present invention, the oxygen storage material is $Ce_{0.24}Zr_{0.66}La_{0.4}Y_{0.06}O_2$ (CZLY). In another preferred embodiment, the oxygen storage material is $Ce_{0.68}Zr_{0.32}O_2$ (CZO). Other oxygen storage materials may also be suitable.

If the catalyst according to embodiments of the present invention comprises at least one oxygen storage material, the catalyst may comprise about 10 to about 90 weight percent oxygen storage material, preferably about 20 to about 70 weight percent oxygen storage material, more preferably about 30 to about 60 weight percent oxygen storage material, and most preferably about 40 weight percent oxygen storage material. The weight percent of the oxygen storage material is on the basis of the oxides.

Although not wishing to be limited to a theory, it is believed that the oxygen storage material may enhance the performance of the catalysts according to embodiments of the present invention by improving the ability of the catalyst to oxidize NO to $NO_2$. $NO_2$ may react more rapidly with ammonia or other reducing agent than does NO. Enhancing the ability of the catalyst to oxidize NO to $NO_2$ may therefore improve the activity of the catalyst to catalyze the selective reduction of $NO_x$ with ammonia. The oxygen storage material may also improve the rheology of aqueous slurries for the optional washcoat (described below) that comprise the oxygen storage material.

Inorganic Oxide

The catalyst according to the present invention may also comprise at least one inorganic oxide selected from the group consisting of $Al_2O_3$, $SiO_2$, $TiO_2$, $ZrO_2$, $SnO_2$, solutions, composites and mixtures thereof. Without limitation, alumina is an inorganic oxide for use in the catalyst according to embodiments of the present invention. One function of the inorganic oxide is to disperse the first and second components and to help facilitate binding to a substrate. The inorganic oxides may be used, for example, as part of a washcoat, as described below. The inorganic oxides may be substituted for all or part of the oxygen storage material component. In an embodiment, the sum of the amount of oxygen storage material and the amount of inorganic oxide may be an amount as previously given for the oxygen storage material alone. The other inorganic oxides may be substituted, all or in part, for the oxygen storage material, although the inorganic oxides may have a different function than the oxygen storage material. Inorganic oxides may improve the rheology of aqueous slurries for the optional washcoat and enhance wash-coat adhesion to a substrate, if the catalyst is to be coated on a monolith.

Shaped Catalyst

In an embodiment, the catalyst of the present invention may be molded into a suitable shape such as a honeycomb, pellets, or beads. In another embodiment, the catalyst may be extruded into extrudates.

In an embodiment, the catalyst according to embodiments of the present invention may be formed by milling or mulling at least one of: a first component comprising a zeolite or mixture of zeolites selected from the group consisting of ZSM-5, ZSM-11, ZSM-12, ZSM-18, ZSM-23, MCM-zeolites, mordenite, faujasite, ferrierite, zeolite beta, and mixtures thereof; a second component comprising at least one member selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof to form a paste. The oxygen storage material may also be milled or mulled with any or all of the other components. The remaining components of the catalyst may be added by methods well known to those skilled in the art.

The paste may be extruded through a die to form extrudates. The extrudates may be dried and calcined, thereby forming the catalyst. Other manners of forming shaped catalysts may also be suitable.

Catalyst Composition

Advantageously, the catalyst according to embodiments of the present invention may be combined with a substrate to form a catalyst composition. Accordingly, another aspect of the present invention provides a catalyst composition that comprises:

(a) a substrate;
(b) a catalyst comprising:
  a first component comprising a zeolite or mixture of zeolites selected from the group consisting of ZSM-5, ZSM-11, ZSM-12, ZSM-18, ZSM-23, MCM-zeolites, mordenite, faujasite, ferrierite, zeolite beta, and mixtures thereof;
  a second component comprising at least one member selected from the group consisting of cerium, iron, copper, gallium, manganese, chromium, cobalt, molybdenum, tin, rhenium, tantalum, osmium, barium, boron, calcium, strontium, potassium, vanadium, nickel, tungsten, an actinide, mixtures of actinides, a lanthanide, mixtures of lanthanides, and mixtures thereof;
  optionally an oxygen storage material;
  and optionally an inorganic oxide.

The inorganic oxide may be part of a washcoat, or the inorganic oxide may be separate from the washcoat. In another embodiment, the inorganic oxide may be part of the washcoat.

Substrate

As used herein, a substrate may be any support structure known in the art for supporting catalysts. The substrate can be a refectory material, a ceramic substrate, a honeycomb structure, a porcelain substrate, a metallic substrate, a ceramic foam, a reticulate foam, or suitable combinations, where the substrate has a plurality of channels and the required porosity. Porosity is substrate dependent. Additionally, the number of channels may vary depending upon the substrate used. The channels found in a monolith substrate are described in more detail below. The type and shape of suitable substrates would be apparent to one of ordinary skill in the art. In one embodiment of the present invention, the substrate may be in the form of beads or pellets. The beads or pellets may be formed from alumina, silica alumina, silica, titania, mixtures thereof, or any suitable material. In an embodiment of the present invention, the substrate may be a honeycomb support. The honeycomb support may be a ceramic honeycomb support or a metal honeycomb support. The ceramic honeycomb support may be formed, for example, from sillimanite, zirconia, petalite, spodumene, magnesium silicates, mullite, alumina, cordierite ($Mg_2Al_4Si_5O_{18}$), other alumino-silicate materials, silicon carbide, or combinations thereof. Other ceramic supports may also be suitable.

If the support is a metal honeycomb support, the metal may be a heat-resistant base metal alloy, particularly an alloy in which iron is a substantial or major component. The surface of the metal support may be oxidized at elevated temperatures above about 1000° C. to improve the corrosion resistance of the alloy by forming an oxide layer on the surface of the alloy. The oxide layer on the surface of the alloy may also enhance the adherence of a washcoat to the surface of the monolith support. Preferably, all of the substrate supports, either metallic or ceramic, offer a three-dimensional support structure.

In one embodiment of the present invention, the substrate may be a monolithic carrier having a plurality of fine, parallel flow passages extending through the monolith. The passages can be of any suitable cross-sectional shapes and sizes. The passages may be, for example, trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

The substrate can also be any suitable filter for particulates. Some suitable forms of substrates may include woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. They may differ from the honeycomb substrates that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filter.

Washcoat

In some embodiments, at least a portion of the catalyst of the present invention may be placed on the substrate in the form of a washcoat. The term "washcoat," as used herein, refers to a coating of oxide solids on the substrate or solid support structure. The oxide solids in the washcoat may be one or more carrier material oxides, one or more catalyst oxides, or a mixture of carrier material oxides and catalyst oxides. Carrier material oxides are porous solid oxides that may be used to provide a high surface area for a dispersed phase. Carrier materials are normally stable at high temperatures and under a range of reducing and oxidizing conditions. The zeolite and the oxygen storage material may be oxide solids and each may be part or all of the washcoat. The inorganic oxide may also be an oxide solid and may be part or all of the washcoat.

In an embodiment, a washcoat may be formed on the substrate by suspending the carrier materials in water to form an aqueous slurry and placing (placing includes but is not limited to depositing, adhering, curing, coating, and any known coating processes to coat a film on a substrate) the aqueous slurry on the substrate as a washcoat. The carrier materials in the slurry may comprise the zeolite or mixture of zeolites, or the zeolite(s) and the oxygen storage material. In an embodiment, the oxide solids that comprise the washcoat may comprise optionally the zeolite(s) and/or the oxygen storage material. In an another embodiment the washcoat may further comprise at least one inorganic oxide selected from the group consisting of alumina, silica, titania, silica-alumina, and solid solutions, composites, and mixtures thereof.

Other components such as salts of the second component may optionally be added to the aqueous slurry. Other components such as acid or base solutions or various salts or organic compounds may be added to the aqueous slurry to adjust the rheology of the slurry. Some examples of compounds that can be used to adjust the rheology include, but are not limited to ammonium hydroxide, aluminum hydroxide, acetic acid, citric acid, tetraethylammonium hydroxide, other tetralkylammonium salts, ammonium acetate, ammonium citrate, glycerol, commercial polymers such as polyethylene glycol, and other suitable polymers.

In an embodiment, the second component may be added to the aqueous slurry as oxides or other compounds, for example nitrates, acetates or other salts and/or mixtures thereof. The slurry may be placed on the substrate in any suitable manner. For example, the substrate may be dipped into the slurry, or the slurry may be sprayed onto the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages may contact the washcoat on the walls of the passages as well as materials that are supported on the washcoat.

It is believed that the oxygen storage material may improve the rheology of the washcoat slurry. Such improvement may be seen in process control and/or manufacture of the catalyst. The enhanced rheology of the washcoat slurry that may be due to the presence of the oxygen storage material may enhance the adhesion of the washcoat slurry to the substrate.

In an embodiment of the present invention, a washcoat may be formed by slurry depositing the zeolite and optionally the oxygen storage material onto the substrate. The washcoat may also comprise at least one inorganic oxide selected from the group consisting of alumina, silica, titania, silica-alumina, and solid solutions, composites, and mixtures thereof. A solution comprising water-soluble precursor salts of the second component may be impregnated and/or exchanged into the washcoat after the washcoat is placed on the substrate. In an alternative embodiment, salts of the second component may be added to the aqueous slurry for the washcoat. In yet another embodiment, the second component may be added to the aqueous slurry for the washcoat as oxides.

The substrate, the washcoat, and the impregnated or exchanged solution (comprising water-soluble precursor salts of the second component) may be calcined to form the catalyst composition before or after the washcoat and/or the solution are added to the substrate. In an embodiment, the washcoat and the impregnated or exchanged solution may be dried before calcining.

Method for Removing $NO_x$

The exhaust gas may be contacted with the catalyst according to embodiments of the present invention in the presence of ammonia sufficient to reduce the $NO_x$ that is contained in the exhaust gas. The ammonia may normally be introduced into the exhaust gas before the exhaust gas contacts the catalyst according to an embodiment of the present invention. The exhaust gas and the ammonia as a reducing agent may be contacted with the catalyst, thereby reducing the nitrogen oxides in the exhaust gas.

Urea, ammonium hydroxide, ammonium formate, ammonia gas, or any other suitable source of ammonia may be used as a source of ammonia.

The ammonia/$NO_x$ mole ratio may be in a range of about 0.5 to about 4, more preferably in a range of about 0.6 to about 2, and most preferably in a range of about 0.8 to about 1.5. Low ammonia/$NO_x$ ratios may generally be preferred in order to minimize excess ammonia in the exhaust gas. Excess ammonia in the exhaust gas may be undesirable due to health or odor issues.

The space velocity of the exhaust gas and the ammonia passing through the catalyst may be in a range of about 1,000 $hr^{-1}$ to about 150,000 $hr^{-1}$, more preferably in a range of about 5,000 $hr^{-1}$ to about 100,000 $hr^{-1}$, and most preferably in a range of about 10,000 $hr^{-1}$ to about 60,000 $hr^{-1}$.

The exhaust gas and ammonia may be contacted with the catalyst at a temperature of about 300° C. to about 700° C., more preferably at a temperature of about 350° C. to about 600° C., and most preferably at a temperature of about 450° C. to about 600° C.

If excess ammonia is present in the exhaust gas, at least a portion of the excess ammonia may be oxidized to nitrogen by the catalyst according to embodiments of the present invention.

The following examples are intended to illustrate, but not to limit, the scope of the invention. It is to be understood that other procedures known to those skilled in the art may alternatively be used.

Example 1

Preparation of Cerium Mixed Washcoat Catalyst

A cerium mixed washcoat catalyst (Catalyst 1) was prepared as follows. An aqueous slurry of mixed washcoat was formed. The mixed washcoat contained about 10% alumina, 50% mixed zeolites, and 40% $Ce_{0.24}Zr_{0.66}La_{0.04}Y_{0.06}O_2$. The mixed zeolites were H-ZSM-5 and H-beta in a 50:50 weight ratio. All percentages are by weight unless otherwise indicated.

The slurry was ball milled to a particle size ($d_{50}$) of about 4-5 μg. The slurry was placed on a 400 cells per square inch monolith substrate such that the wall passages of the monolith were coated with the washcoat at a loading of about 160 g/L. The coated monolith was placed under light to confirm that no channels were plugged by the mixed washcoat slurry. If there were any plugged or clogged channels, they were cleared by blowing air using an air-knife. The washcoated substrate was dried by blowing air through the open channels at room temperature for about 10 to 15 hours. The dried washcoated substrate was calcined in a static air furnace at about 550° C. for about 4 hours.

The calcined substrate was cooled to room temperature, and the water pick up of the washcoated substrate was determined. Sufficient cerium nitrate solution to form a cerium containing mixed washcoat catalyst with a cerium metal loading of 19 g/L of the catalyst was dissolved in an amount of distilled water equal to the water pick up of the washcoated substrate. This cerium nitrate solution was impregnated uniformly into the washcoated substrate. The cerium nitrate solution impregnated monolith was placed under light to confirm that no channels were plugged by the cerium nitrate impregnation solution. If there were any plugged, clogged or wicked channels, they were cleared by blowing air using an air-knife. The substrate was dried by blowing air through the channels at room temperature for about 10 to 15 hours. The dried substrate was calcined at about 550° C. for about 1 hour.

A similar procedure was used to obtain cerium mixed washcoat catalysts with cerium loadings of 5 g/L, 10 g/L, 22 g/L, 30 g/L and 40 g/L.

Figure 1:
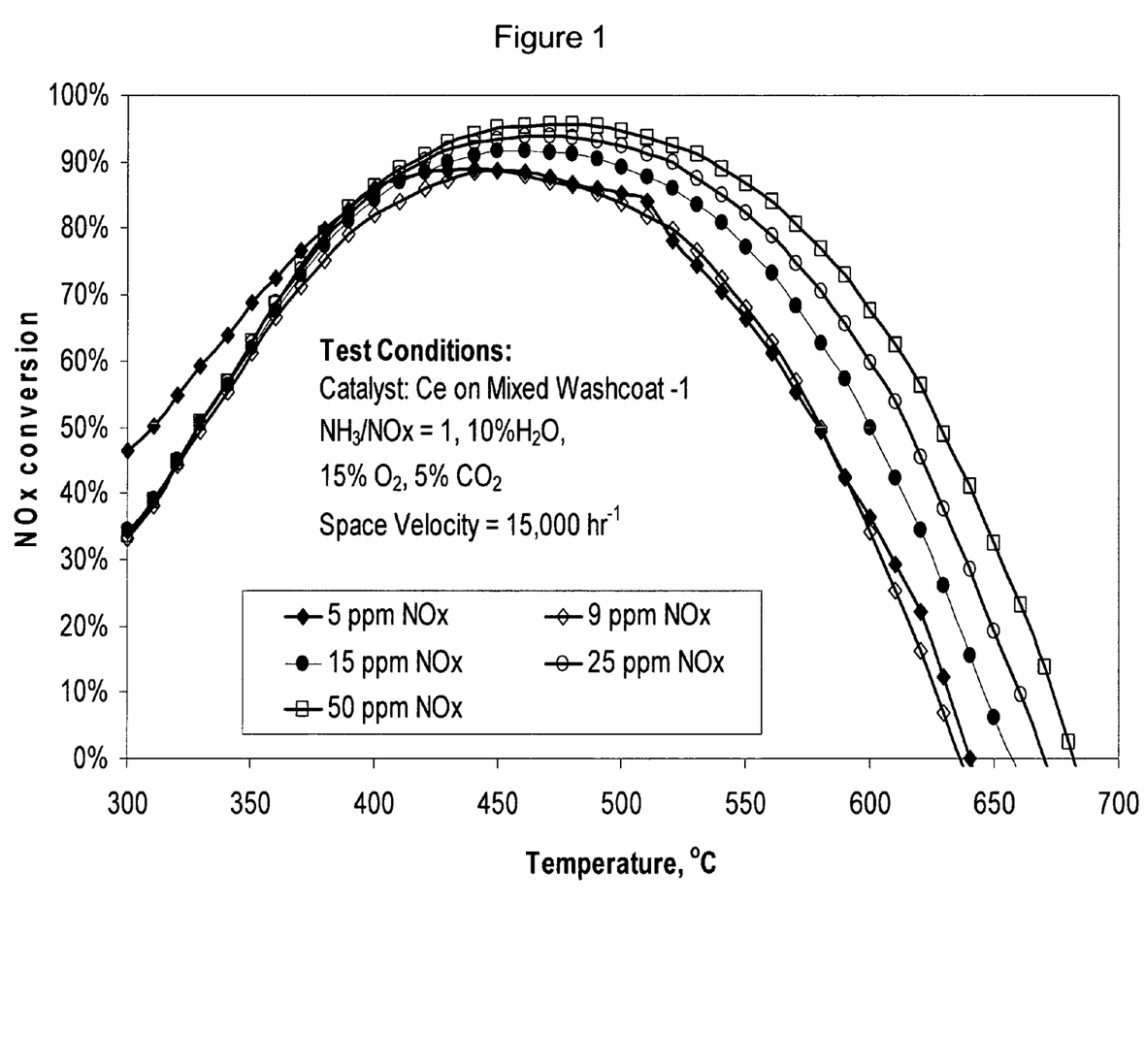
FIG. 1 is a plot showing the percent of $NO_x$ conversion versus temperature in degrees Centigrade, using a cerium mixed washcoat catalyst where the cerium loading on the cerium mixed washcoat catalyst is 19 g/L. The plot shows five bell shaped curves at various inlet $NO_x$ conditions.

The cerium catalyst with a cerium loading of 19 g/L and a mixed washcoat loading of around 160 g/L was tested in the temperature range of 300° C. to 700° C. at various inlet $NO_x$ conditions using a $NH_3/NO_x$ ratio of 1 and at a space velocity of 15,000 hr-1. The results are shown in FIG. 1.

The results indicate that the performance of the cerium containing catalyst depends on the testing conditions, especially on the amount of $NO_x$ present that needs to be removed, particularly at high temperatures. For example, at a temperature of 550° C., when a feed gas containing 5 ppm $NO_x$ was tested, the $NO_x$ removal efficiency was around 60% whereas, using the same catalyst with a feed gas containing 50 ppm $NO_x$ at a temperature of 550° C., the observed $NO_x$ removal efficiency was around 90%.

Example 2

Preparation of Cerium Mixed Washcoat Catalyst

A cerium mixed washcoat catalyst (Catalyst 2) was prepared as follows. An aqueous slurry of mixed washcoat containing cerium was formed. Powders of 10% alumina, 50% mixed zeolites, and 40% $Ce_{0.24}Zr_{0.66}La_{0.04}Y_{0.06}O_2$ were mixed with a solution containing cerium nitrate and water. The mixed zeolites were H-ZSM-5 and H-beta in a 50:50 weight ratio. Sufficient cerium nitrate solution was used in order to result in 22 g/L cerium on the final catalyst.

The slurry was ball milled to a particle size ($d_{50}$) of about 4-5 μl. The slurry was placed on a 400 cells per square inch monolith substrate such that the wall passages of the monolith were coated with the cerium containing mixed washcoat at a loading of about 160 g/L. The coated monolith was placed under light to confirm that no channels were plugged by the mixed washcoat slurry. If there were any plugged or clogged channels, they were cleared by blowing air using an air-knife. The cerium containing mixed washcoated substrate was dried by blowing air through the open channels at room temperature for about 10 to 15 hours. The dried washcoated substrate was calcined in a static air furnace at about 550° C. for about 4 hours.

The calcined substrate was cooled to room temperature to obtain a 22 g/L cerium containing mixed washcoat catalyst (Catalyst 2).

Example 3

Preparation of Mixed Washcoat Catalyst Containing No Cerium

A catalyst containing no cerium was prepared according to the procedure described in Example 2 except that no cerium nitrate solution was added to the powder mixture. The slurry was formed by mixing the powders described in Example 2 with water. The mixed washcoat loading on the final catalyst was about 160 g/L.

Example 4

Preparation of Mixed Washcoat Catalyst without Zeolite

Powders of $Al_2O_3$ and $Ce_{0.24}Zr_{0.66}La_{0.04}Y_{0.06}O_2$ were combined in a 50:50 ratio. A slurry was prepared by combining this mixture with water and a cerium nitrate solution. Sufficient cerium nitrate solution was used in order to result in 22 g/L cerium in the final catalyst. The slurry was coated on a 400 cells per square inch substrate and a final catalyst was obtained following the procedure described in Example 2. The mixed washcoat loading on the final catalyst was about 160 g/L with a cerium loading of 22 g/L (Catalyst 3).

Example 5

Performance of Various Mixed Washcoat Catalysts

The cerium containing mixed washcoat catalysts prepared according to Examples 1, 2, and 4 and the mixed washcoat catalyst containing no cerium prepared according to Example 3 were tested for $NO_x$ reduction activity in the temperature range of 300 to 700° C. using 50 ppm inlet $NO_x$ and 50 ppm $NH_3$. Comparable tests were conducted at a space velocity of 25,000 h$^{-1}$. The results are plotted in FIG. 2.

Figure 2:
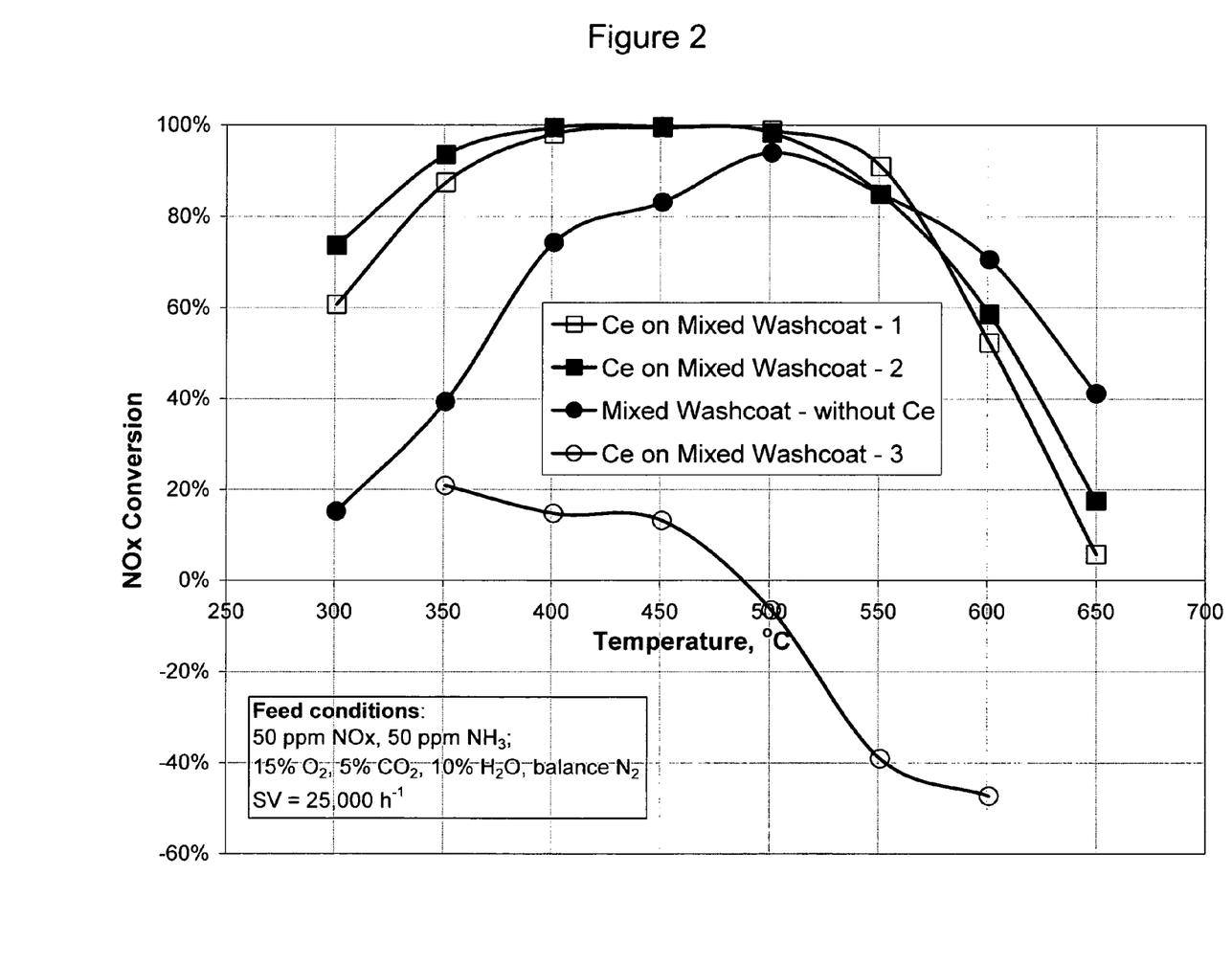
FIG. 2 is a plot showing the percent of $NO_x$ conversion versus temperature in degrees Centigrade using various cerium mixed washcoat catalysts and a mixed washcoat catalyst containing no cerium.

The results indicate that irrespective of how the cerium is introduced into the mixed washcoat, the level of $NO_x$ conversion, especially at higher temperatures, remains the same. FIG. 2 also shows that cerium is required in the mixed washcoat to achieve good performance in the temperature range of 300 to 500° C. Negative $NO_x$ conversions were observed when the test was performed using the catalyst described in Example 4. The reason for this is because this catalyst was not only inactive for conversion of $NO_x$ to $N_2$ using $NH_3$, but it also oxidized $NH_3$ to $NO_x$ thereby increasing the total $NO_x$ content of the gas composition post catalyst when compared to the feed composition prior to the catalyst.

Example 6

Performance of Samples Containing Varying Cerium Loadings on Mixed Washcoat

Figure 3:
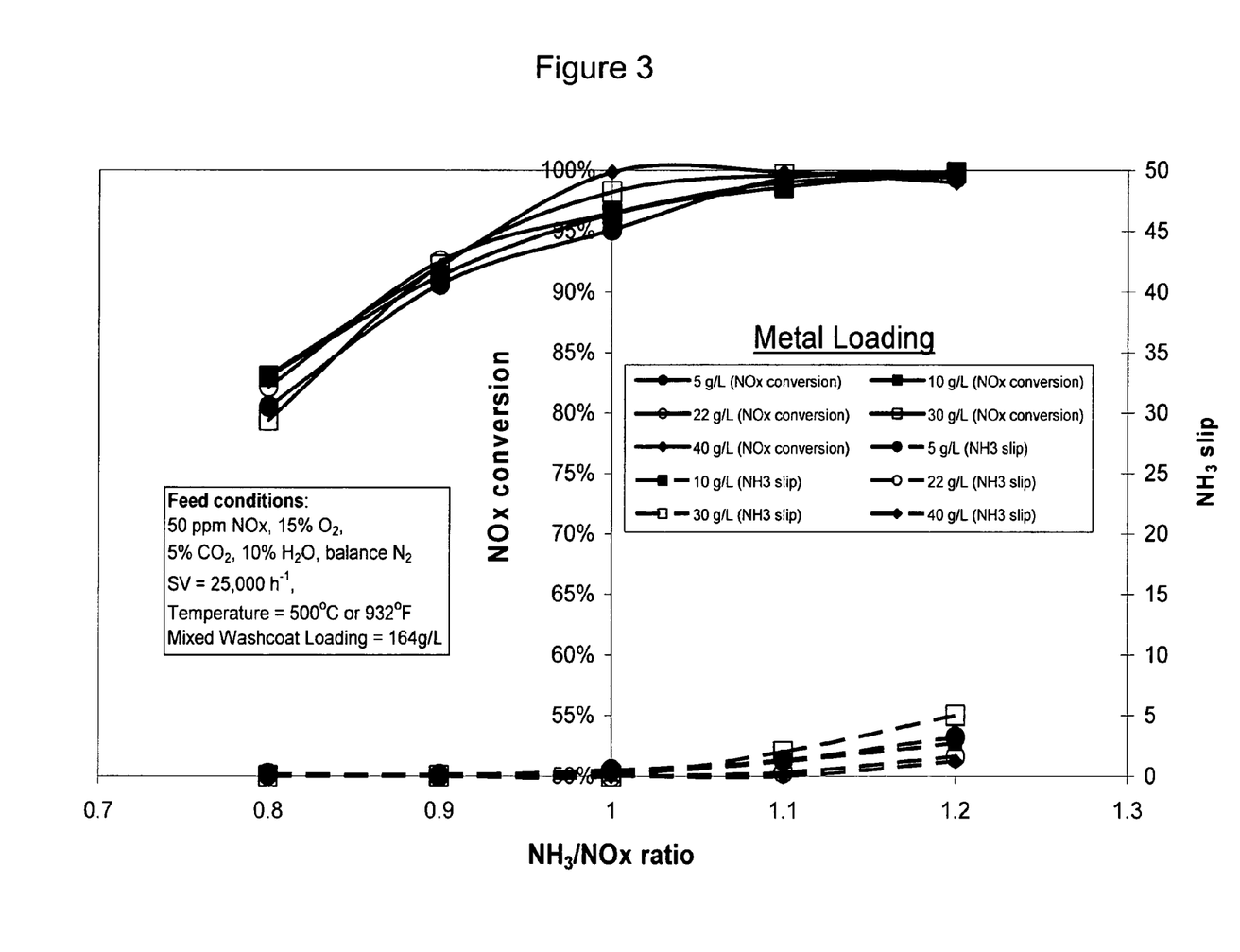
FIG. 3 is a plot showing the percent of $NO_x$ conversion and $NH_3$ slip versus $NH_3/NO_x$ ratio using catalysts containing various amounts of cerium.

Catalyst samples were prepared with various cerium loadings as described in Example 1 and were tested for $NO_x$ conversion activity at various $NH_3/NO_x$ ratios. FIG. 3 shows a plot of $NO_x$ conversion on the primary Y-axis and $NH_3$ slip on the secondary Y-axis versus $NH_3/NO_x$ ratio on the X-axis. $NH_3/NO_x$ ratio was varied from 0.8 to 1.2. All catalyst samples with various cerium loadings resulted in a very high conversion of $NO_x$ under the test conditions. The mixed washcoat catalysts containing various cerium loadings also resulted in very low $NH_3$ slip.

Example 7

Performance of Samples with Varying Mixed Washcoat Loadings

Figure 4:
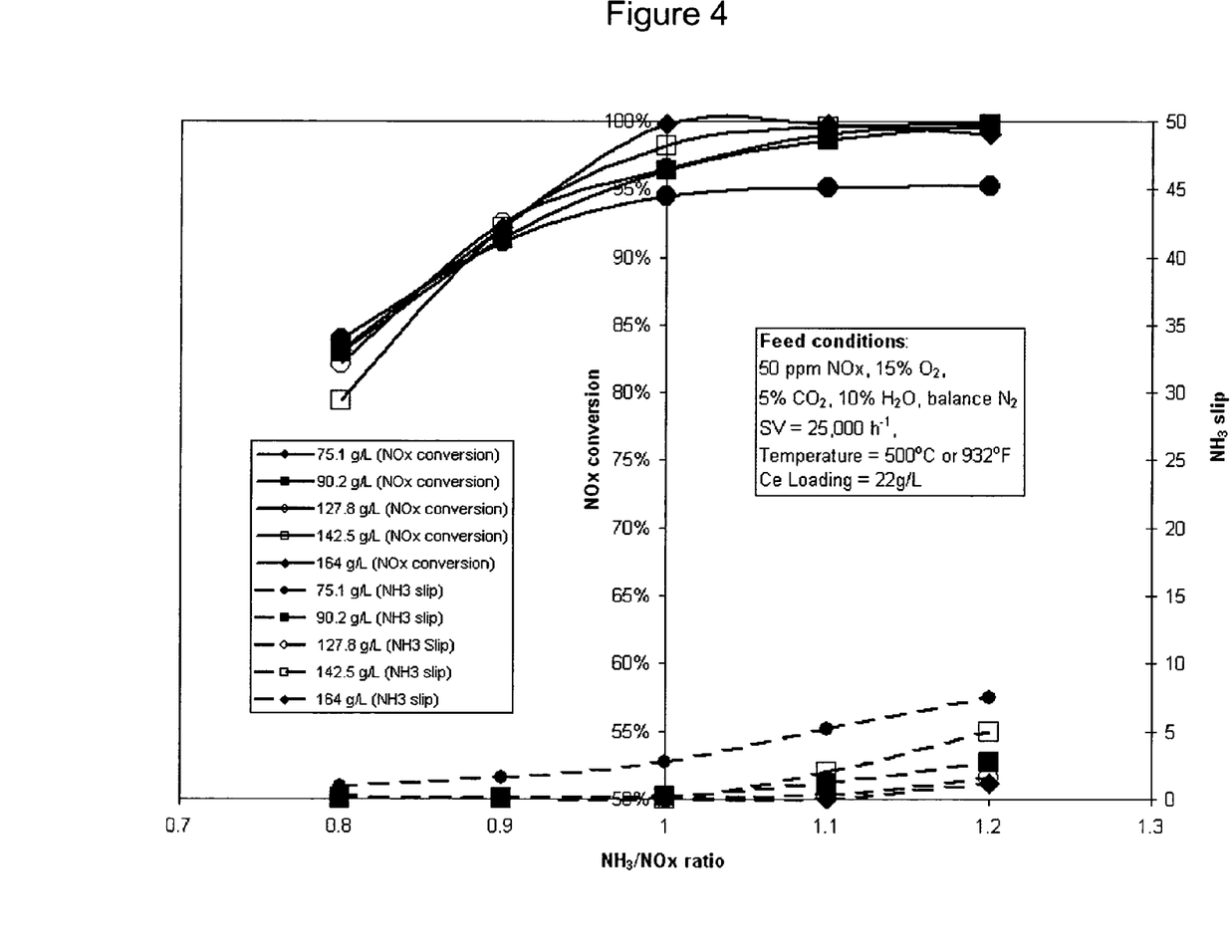
FIG. 4 is a plot showing the percent of $NO_x$ conversion and $NH_3$ slip versus $NH_3/NO_x$ ratio using catalysts with various mixed washcoat loadings.

Catalyst samples were prepared according to the procedure described in Example 2 with various washcoat loadings using a mixed washcoat already containing cerium. The samples contained mixed washcoat loadings of 75.1 g/L, 90.2 g/L, 127.8 g/L, 142.5 g/L, and 164 g/L. The catalyst samples were tested for $NO_x$ conversion activity at various $NH_3/NO_x$ ratios. FIG. 4 shows a plot of $NO_x$ conversion on the primary Y-axis and $NH_3$ slip on the secondary Y-axis versus $NH_3/NO_x$ ratio on the X-axis. $NH_3/NO_x$ ratio was varied from 0.8 to 1.2. The results suggest that an optimal washcoat loading of 160 g/L is necessary to achieve good $NO_x$ conversion and low $NH_3$ slip at various test conditions.

Example 8

Long-Term Activity Test

Figure 5:
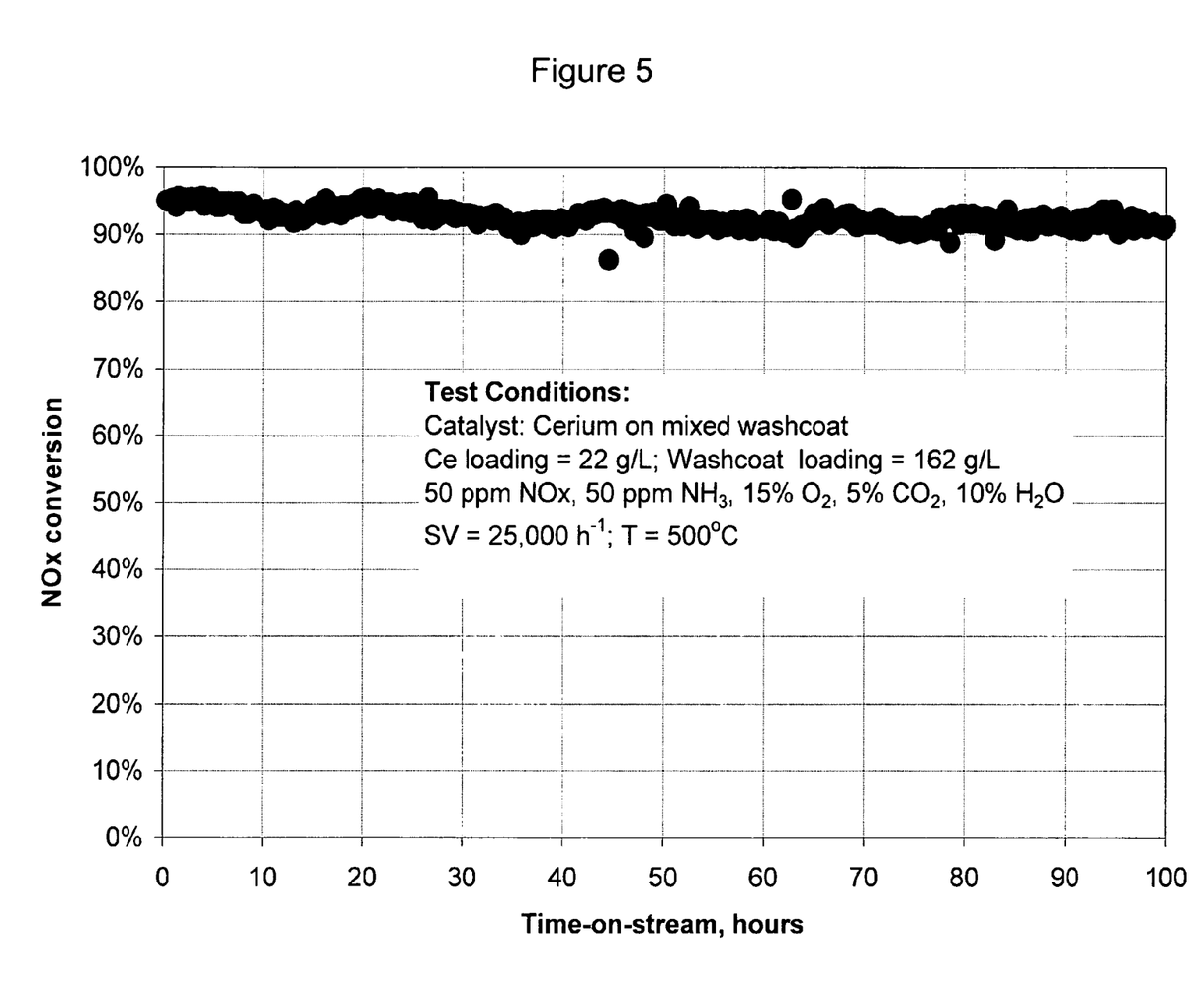
FIG. 5 is a plot showing $NO_x$ conversion versus time-on-stream in hours at 500° C. using a cerium mixed washcoat catalyst.

Using the catalyst sample described in Example 1, a test was conducted at 500° C. using feed gas containing 50 ppm $NO_x$, 50 ppm $NH_3$, 15% $O_2$, 10% $H_2O$, 5% $CO_2$ and the balance as $N_2$. The test was conducted without any interruption for 100 hours and data was collected every 15 minutes. FIG. 5 shows a plot of $NO_x$ conversion versus time-on-stream in hours. The results indicate that there is no significant deactivation of the catalyst observed at 500° C.

The catalysts according to embodiments of the present invention have high $NO_x$ conversion activity at high temperatures and are able to reduce low levels of inlet $NO_x$ even further. In addition, the catalysts according to embodiments of the present invention also have high hydrothermal stability.

The catalysts according to embodiments of the present invention may have applications to gas streams having excess oxygen and having a temperature in the range of about 300° C. to about 700° C. Some examples of applications include, but are not limited to, exhaust gas from gas turbines, exhaust gas from gas engines, exhaust gas from electrical generation plants, exhaust gas from chemical plants, and other suitable applications.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A catalyst for selective catalytic reduction of nitrogen oxides with ammonia at exhaust temperatures greater than about 300° C., the catalyst comprising:
    a first component comprising a zeolite selected from the group consisting of ZSM-5, zeolite beta, and mixtures thereof, wherein the catalyst comprises about 40 to about 80 weight percent zeolite;
    a second component comprising at least one member selected from the group consisting of cerium, iron, manganese, and mixtures thereof;
    and about 30 to about 60 weight percent of an oxygen storage material, based on the entire catalyst composition, wherein the oxygen storage material composition comprises $Ce_{1-c-d}Zr_cLan_dO_2$, where Lan is one or more of Y, La, Pr, Nd, Sm, Eu, Gd, Ho, Yb, the weight percent of the oxygen storage material is on the basis of the oxides in the oxygen storage material;
    optionally, an inorganic oxide component;
    wherein the catalyst comprises about 5 to about 20 weight percent of the second component, where the weight percentage of the second component is calculated based on the total metal content relative to the total weight of the zeolite, oxygen storage material and any inorganic oxide.

2. The catalyst of claim 1 further comprising an inorganic oxide.

3. The catalyst of claim 1, wherein the catalyst comprises the first component, second component, and oxygen storage material in a 50:10:30 ratio based on weight, wherein the weight of the second component is on a metal weight basis.

4. The catalyst of claim 1, wherein the catalyst is a powder.

5. The catalyst of claim 4, wherein about 50 weight percent of the zeolite is present in the powder.

6. The catalyst of claim 1, wherein the zeolite is in a form selected from the group consisting of protonic form, ammonia form, sodium form and mixtures thereof.

7. The catalyst of claim 1, wherein the zeolite comprises ZSM-5.

8. The catalyst of claim 1, wherein the zeolite comprises zeolite beta.

9. The catalyst of claim 1, wherein the zeolite comprises zeolite beta and ZSM-5.

10. The catalyst of claim 9, wherein zeolite beta and ZSM-5 are present in a 1:1 ratio.

11. The catalyst of claim 1, where the second component comprises cerium.

12. The catalyst of claim 1, where the second component comprises iron.

13. The catalyst of claim 1, wherein the second component comprises manganese.

14. The catalyst of claim 1, wherein the catalyst is extruded in the form of a shape.

15. The catalyst of claim 1, wherein the catalyst is coated on a substrate.

16. The catalyst of claim 15, where the substrate is selected from the group consisting of a refractory material, a ceramic substrate, a honeycomb structure, a porcelain substrate, a metallic substrate, a ceramic foam, a reticulate foam, and mixtures thereof, wherein the catalyst is deposited on the substrate, wherein the substrate has a plurality of channels and a porosity.

17. The catalyst of claim 1, wherein the second component is treated with the first component and mixed with the oxygen storage material to obtain a final catalyst.

18. The catalyst of claim 2, wherein the catalyst comprises about 50 weight percent of the first component, about 10 weight percent of the second component, about 30 weight percent of the oxygen storage material, and about 10 weight percent of the inorganic oxide, wherein the weight percent of the second component is on a metal weight basis.

19. The catalyst of claim 2, wherein the inorganic oxide is selected from the group consisting of $Al_2O_3$, $SiO_2$, $TiO_2$, $ZrO_2$, $SnO_2$, composites and mixtures thereof.

* * * * *